Feb. 15, 1966 R. G. RUPLI 3,235,353
APPARATUS FOR BLOWING AND COOLING GLASSWARE
Filed Sept. 7, 1961 3 Sheets-Sheet 2
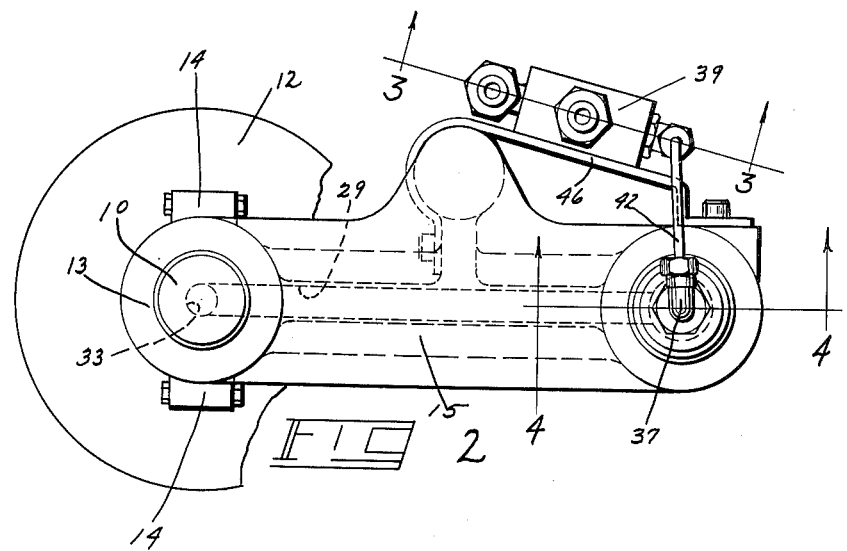
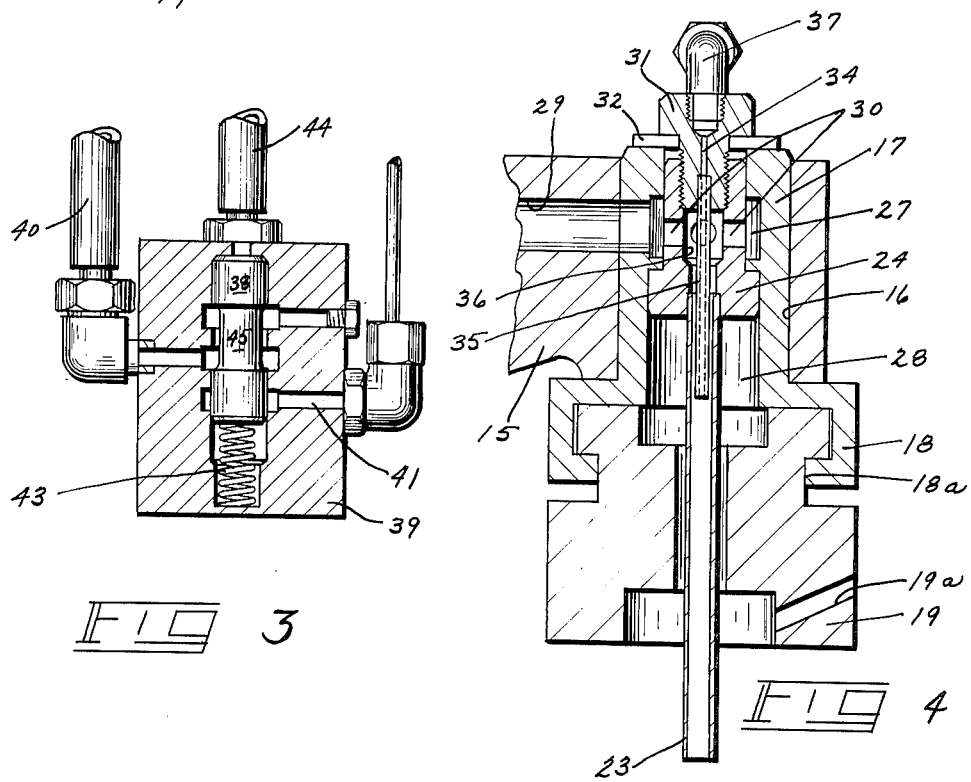
INVENTOR.
RICHARD G. RUPLI
BY W. A. Schaich &
D. V. Innis
ATTORNEYS

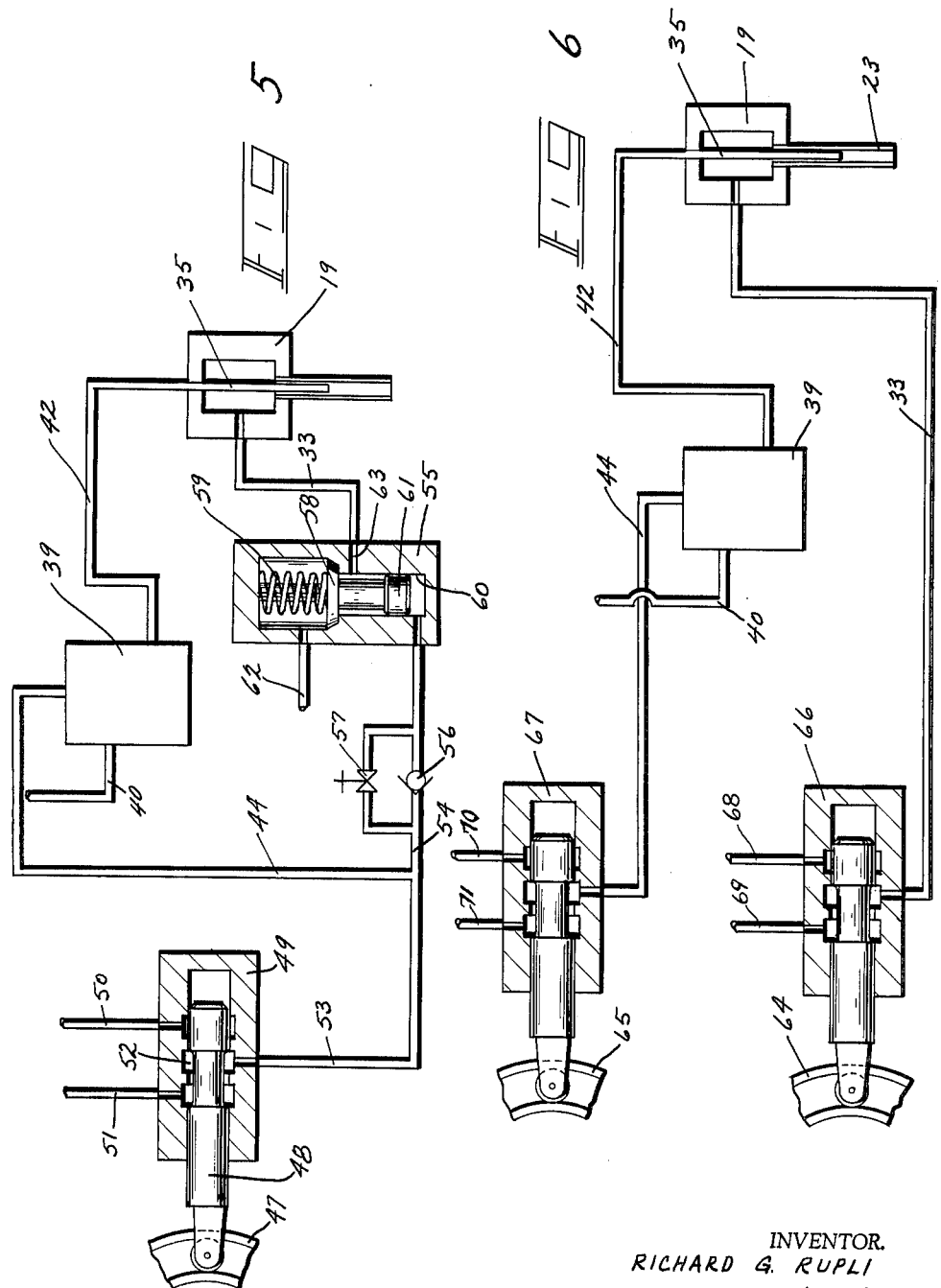

3,235,353
APPARATUS FOR BLOWING AND
COOLING GLASSWARE
Richard G. Rupli, Bedford Township, Mich., assignor to
Owens-Illinois Glass Company, a corporation of Ohio
Filed Sept. 7, 1961, Ser. No. 136,519
1 Claim. (Cl. 65—262)

This invention relates to an improved method and apparatus for blowing and cooling articles of glassware. An example of presently existing apparatus for blowing and cooling glassware is shown in U.S. Pat. No. 2,123,-145, granted July 5, 1938, to K. E. Peiler. The Peiler patent discloses apparatus for blowing and cooling glassware by the use of a combination blow head and internal cooling arrangement which is adapted to apply a selected blowing pressure and maintain such pressure in a hollow glass parison in a mold without escape or waste of the blowing pressure fluid for a predetermined period of time and then to permit escape or exhaust of the pressure fluid from the interior of the articles for a further period of time to effect internal cooling of the articles while maintaining the fluid at a sufficient pressure to continue the external absorption of heat from the article by the surrounding mold.

It has been suggested that atomized water may be used in conjunction with the blowing air, however, no practical or efficient method or apparatus for applying this atomized water to articles as they are blown has been effective.

An object of this invention is to provide a method and apparatus for expanding parisons within blow molds by the use of air and chilling the internal surface of the blown bottle by the use of water vapor introduced in the blow air.

A further object of this invention is to provide apparatus for injecting measured quantities of water into the blow air in a predetermined cycle so that bottles may be tempered while still retained within the blow mold and no liquid residue will be present in the finished glassware.

Other and further objects will be apparent when taken in conjunction with the annexed sheets of drawings wherein:

FIG. 2 is a top plan view of the apparatus of FIG. 1.

FIG. 3 is a cross-sectional view of the water injection control valve taken at line 3—3 on FIG. 2.

FIG. 4 is a cross-sectional view of the blow head and holder taken at line 4—4 on FIG. 2.

FIG. 5 is a schematic fluid circuit diagram for controlling the blow air supply and operating the water valve, and FIG. 6 is a schematic fluid circuit diagram which is a modification of that shown on FIG. 5.

Figure 1:
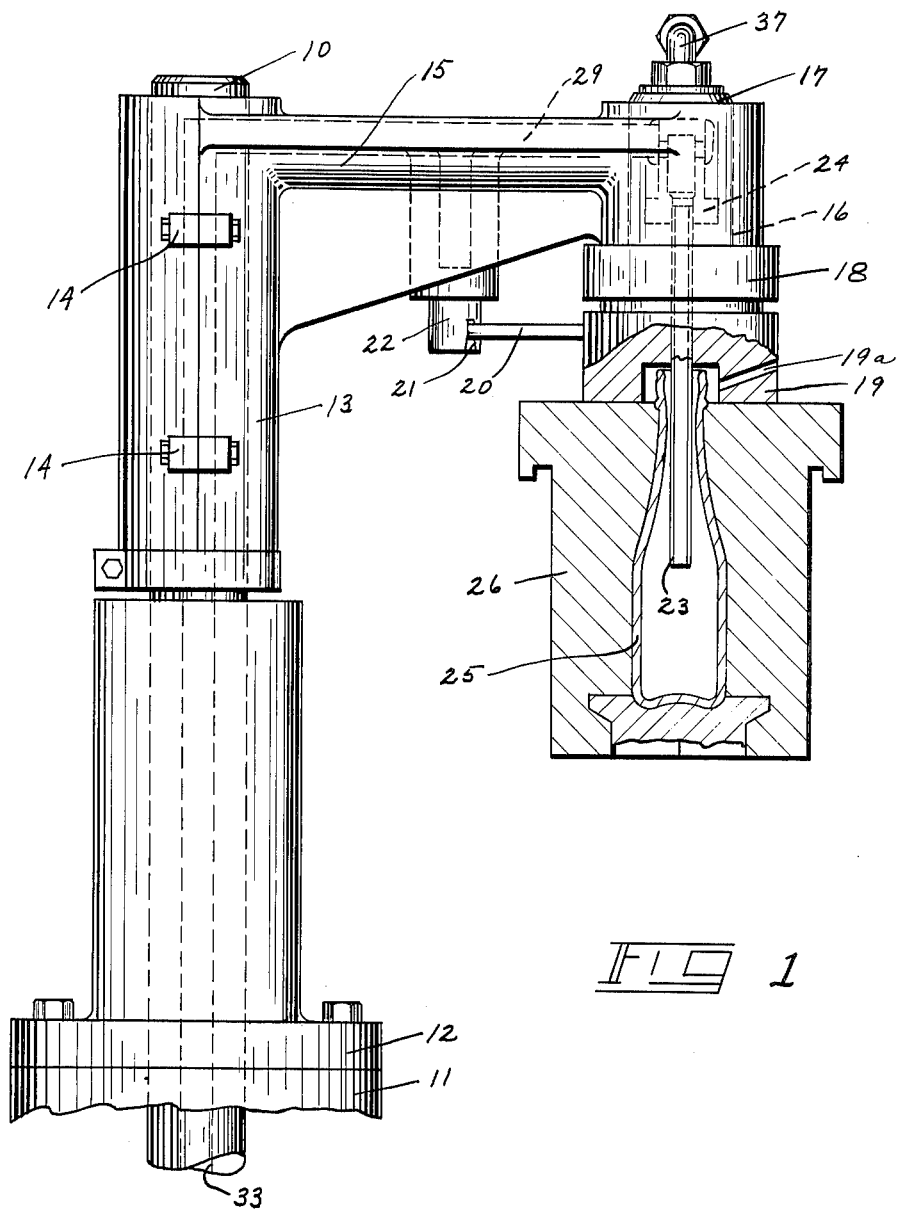
FIG. 1 is a schematic view, mainly in side elevation, with portions broken away, showing the improved apparatus for blowing and cooling glassware.

Referring to the drawings, and in particular to FIGS. 1 and 2, there is shown a vertically disposed rod 10 which may be the blow head supporting and operating piston rod of the well-known Hartford I.S. forming machine. This rod is supported and operated by a piston (not shown) in a vertically disposed cylinder 11, which is shown in part in FIG. 1. The upper head 12 of this cylinder is shown in FIGS. 1 and 2.

A sleeve 13 has clamp portions 14 by which it is secured releasably to the upper portion of the vertical rod 10. This sleeve carries a laterally extending bracket arm 15 which is utilized to support and carry the novel combination blow head and cooling mechanism and control valve of the present invention.

The outer end portion of the bracket arm 15 is provided with a vertical bore or opening 16 (see FIGS. 1 and 4) in which is mounted the hollow stem 17 of a chuck or holder 18 for a blow head 19. The blow head 19 may be coupled to its holder 18 by a bayonet joint structural arrangement indicated at 18a, FIG. 4, or in any other suitable well-known manner.

When a bayonet joint coupling arrangement is employed, as shown, a laterally extending rod 20 is provided on the blow head which engages with a slot 21 in the lower end portion of a keeper 22 to prevent the blow head from rotating in its holder to accidentially disengage the blow head from its holder.

The holder 18 is retained in the vertical opening 16 of the bracket arm 15 in a suitable manner. A fluid pressure delivery tube 23, FIGS. 1 and 4, depends from a hollow supporting plug 24, retained within the blow head holder 18. The tube 23 extends below the blow head 19 and will extend within a hollow article, such as the bottle 25, when the blow head 19 is seated on the mold 26. The lower end portion of this plug is enlarged so that when it is seated within the stem portion 17 of the holder 18, it will divide the interior of the stem into two chambers 27 and 28. The plug 24 is retained within the stem portion 17 of the chuck or holder 18 by a threaded bolt 31. The bolt 31 bears against a washer 32 which in turn bears against the upper end of the stem portion 17. The tube 23 extends upwardly through the chamber 28 and is fixed to the plug 24 with its interior in communication with the upper chamber 27. Fluid under pressure, which in this case is air, will enter the chamber 27 from a passage 29 which extends through the arm 15. The air in passage 29 communicates with the interior of the plug through radial ports 30 formed in the plug 24. The blow air is supplied to the passage 29 through a vertical bore 33 in the rod 10.

The bolt 31 has an axial opening 34 therethrough to which is connected a small tube 35. The tube 35 depends downwardly through a chamber 36 formed within the plug 24 and extends into the upper end of the tube 23. In this manner the flow of air through the tube 23 will aspirate water which is fed through the tube 35. Water is introduced into the upper end of the plug opening 34 through an elbow fitting 37 which is threaded into an enlarged upper portion of the opening 34 in the bolt 31. Applicant has determined, that in order to provide efficient use of water as a coolant or tempering medium for the bottles 25, it is necessary to regulate the quantity of water which is introduced within the bottles.

The quantity of water is controlled by the cycle of operation of a valve spool 38 which is vertically shiftable within its valve block 39. The valve, shown in detail in FIG. 3, is supplied with water under pressure through a conduit 40. An outlet port 41 in the valve block 39 is connected by a small conduit 42 to the elbow fitting 37. With the valve 38 in the position shown in FIG. 3, no water is delivered through the port 41. The valve 38 is biased in a vertical direction by a spring 43 which will be compressed by the introduction of a pressurized fluid through a conduit 44 which communicates with the upper end of the spool 38. The introduction of fluid under pressure through the conduit 44 is effected in a preselected sequence depending upon the normal forming cycle of the machine.

It can readily be seen that upon application of fluid under pressure through conduit 44 to the valve 38, the valve will be shifted and water under pressure in the conduit 40 will pass by the undercut portion 45 of the valve spool 38 and flow out through the port 41, conduit 42, fitting 37, opening 34 and into the tube 35.

It should be pointed out at this time that the water vapor, when introduced to the interior of a hot blown bottle, will extract a considerable amount of heat from the bottle 25 due to its latent heat of vaporization. However, it has been found in some instances that it is not desirable to produce bottles which have any moisture remaining therein after removal from the blow mold. Therefore, applicant discontinues the introduction of water to the blown ware at a time in the forming cycle such that the blow air, which is continued to be blown through the tube 23, will sweep out any moisture or water vapor from the interior of the bottle through a vent 19a in the blow head 19. In order to provide this cycle of application of water, it is necessary that the quantity of water which is introduced into the blow air be regulated and it is also important that there will be no possibility of water dripping from the tube 23 or tube 35 during the movement of the blow head between the blowing of successive bottles.

It is well-known that the molds on a forming machine are normally hot and when the parisons are transferred to the blow molds, they also are in a particular thermal condition in which certain areas of the parison must be hotter than or in relatively more fluid condition so that upon expansion, the glass will evenly conform to the shape of the blow mold cavity. Thus it is important that when the blow head is first seated over the blow mold that air or air and water, which is introduced through the tube 23, be closely controlled both as to time of introduction and quantity.

To avoid having any areas within the blow head where water might be trapped and thus inadvertently be blown into the parisons during expansion thereof, applicant makes the tube 35 relatively small and the conduit 42, which is the supply pipe for the tube 35, also is made relatively small and short in length, thus the system never contains a large volume of water. With this in mind, applicant mounts the valve block 39 on a bracket 46 which is bolted to the bracket arm 15 in close proximity to the blow head. Furthermore, applicant introduces the water into the blow air at a point in the travel of the blow air which is linear from this point of introduction of the water to the point where the air enters the interior of the parison. This is an important consideration from the standpoint that there are no corners around which the water vapor must pass and thus possibly cause large droplets to form or areas where water might be trapped and later become entrained in the blow air at the wrong time.

With the foregoing precautions applicant has successfully provided a method and apparatus for blowing and cooling bottles while they are retained within the blow mold. Furthermore, applicant has provided a method and apparatus for tempering glassware while it is still retained within the blow mold. Thus when the bottles are removed from the blow molds, it is not necessary to provide extensive dead plate cooling mechanism, and in the case where the bottles are tempered, it is not necessary that the bottles be passed through a lehr.

The two methods of introducing the water into the blow air are best illustrated by reference to FIGS. 5 and 6. FIG. 5 discloses the control circuit for introducing the water into the blow head at approximately the same time that the blow air is introduced. The initiation of the blow cycle begins through the operation of a cam 47 which is driven by the forming machine drive (not shown). Rotation of the cam 47, only a portion of which is shown, will shift the valve spool 48. The valve spool 48 is mounted for horizontal reciprocation within a valve block 49. A conduit 50 connects the valve block 49 to a suitable source of fluid under pressure. A second conduit 51 is also connected to the valve block 49 and serves as an exhaust passage. With the valve in the position shown, the exhaust conduit 51 is in communication with the central chamber 52 of the valve block 49. This chamber 52 is connected to a pressure fluid outlet conduit 53. The conduit 53 branches into two conduits 44 and 54, one of which is the conduit 44 which is connected to the valve block 39 and a second conduit 54 which leads to a blow air control valve 55. The conduit 54 has a check valve 56 therein and a parallel branch conduit, bypassing the check valve 56, has a throttle valve 57 therein.

The blow air control valve takes the form of a pressure operated poppet valve having its valve head 58 seated within the body of the control valve 55. The head is biased in a downward direction by a spring 59 which will resist lifting movement of the valve upon the application of pressure to the lower cylindrical chamber 60 within which a piston-like member 61 is adapted to reciprocate. The member 61, as shown, is connected to the valve head 58 by a reduced cylinder portion.

Thus it can readily be seen that upon the introduction of fluid under pressure to the chamber 60 the member 61 will move and unseat the valve head 58. The blow air, from a suitable source (not shown) will enter the control valve 55 through a conduit 62 and leave the valve block through the outlet port 63. The port 63 is connected to a passage 33 of FIG. 1. At the same time that the pressure fluid is introduced to the blow air control valve 55, the same pressure will be introduced to the water control valve 39 through the conduit 44 causing the water, which is supplied through conduit 40, to flow into the conduit 42 and tube 35. After the blow air and water have been introduced a predetermined time, the cam 47 will move the valve 48 to the position shown in FIG. 5. As previously stated, with the valve 48 in this position, the conduit 53 will be connected to the exhaust conduit 51. When the conduit 53 is connected to exhaust, the water control valve within the block 39 will immediately shut off. The pressure fluid that is trapped within the chamber 60 of the control valve 55 will be forced under the action of spring 59, to flow through the conduit 54 toward the conduit 53. However, due to the fact that the check valve 56, in the conduit 54, prevents flow toward the left in FIG. 5, the trapped fluid must pass through the throttle valve 57. The throttle valve 57 is set to allow the fluid to exhaust from the chamber 60 at a relatively slow rate. At this time the spring 59 is urging the valve 58 in a downward direction but the blow air is still able to pass from the conduit 62 through the port 63 until the head 58 actually seats. The seating of the valve will not occur until a sufficient quantity of fluid has exhausted from the chamber 60. In this manner applicant insures that the blow air will continue to be delivered to the blow head 19 a finite amount of time after the water has been shut off. Thus applicant provides a system whereby the water vapor or moisture, which would normally linger within the interior of the blown bottle, will be swept out by this continued flow of blow air through the interior of the formed bottle and out through the exhaust port 19a after the water has been shut off.

As an alternative arrangement for controlling the blow air water cycle, reference may be had to FIG. 6 in which two cams 64 and 65, driven by the machine drive, are intended to operate two valves 66 and 67. The valve 66 controls the introduction of blow air to the passage 33 and operates upon shifting of the valve to alternatively connect the passage 33 to a suitable source of blow air under pressure in conduit 68 or to exhaust conduit 69. In this manner the duration of the blow air cycle may be positively controlled without the necessity of using a time delay control valve, as disclosed with respect to FIG. 5.

The introduction of water into the blow air is controlled by the shifting of the valve 67 independently of the movement of the valve 66. The valve 67 has a pressure supply conduit 70 and an exhaust conduit 71 connected thereto. The outlet from the valve 67 controls the application of fluid under pressure to the conduit 44 which pressure operates the valve 39 to permit water under pressure from conduit 40 to pass into the conduit 42 which leads to the blow head 19.

Thus it can readily be seen that the arrangement of the control system of FIG. 6 permits the introduction of water into the blow air in any selected cycle depending upon the contour of the cam 65 which controls the introduction of water into the blow air.

In summary, the utilization of the control system of FIG. 5 permits the introduction of water into the blow air at the time that the blow air is first applied to the interior of the parison and upon discontinuance of the blow cycle, the water is automatically shut off and the blow air is permitted to continue to sweep through the interior of the formed bottle for a time depending upon the setting of the throttle valve 57. With the control system of FIG. 6 the blow air is introduced first and the water may be introduced a short time after the introduction of the blow air. When a sufficient amount of water has been injected in the blow air the water supply is shut off and the blow air is permitted to continue to blow and sweep out any moisture remaining within the bottle.

Applicant has found that, depending upon the particular type of ware being formed, it is possible to employ the control circuit of FIG. 5 and inject water into the blow air upon the first introduction of blow air to the interior of the parison without any detrimental chill being applied to the parison before it is completely expanded within the blow mold. With other types of ware it may be desirable to introduce the water into the interior of a completely blown bottle and thus it is necessary to introduce the blow air first and expand the bottle before introducing the water into the formed bottle to chill the bottle. In both instances the introduction of a controlled quantity of water must be discontinued prior to shutting down the blow air because it is necessary to sweep out any residual moisture from the interior of the formed bottles.

Various modifications may be resorted to within the spirit and scope of the appended claim.

I claim:

Apparatus for expanding and blowing hollow glass articles while retained within a blow mold, comprising a blow head support, passage means extending through said support to a point adjacent one end thereof, a vertical opening extending through said one end of said support, a sleeve within said opening, a radial opening formed in said sleeve in complementary relationship with respect to the passage in said support, an annular head mounted on said sleeve and adapted to enclose the finish portion of a parison and seat on the blow mold, a first tube extending axially through said sleeve and head, said first tube being in communication with the air under pressure introduced through said passage and radial opening in said sleeve, a second tube of smaller cross-section than said first tube extending axially part way into said first tube and fixed with respect to said sleeve, means for connecting said second tube to a supply of water under pressure, fluid operated valve means interposed said second tube and said water supply, a second fluid operated valve interposed said passage means and a source of air under pressure, a cam operated control valve connected to both said fluid operated valves for simultaneously passing fluid to said valves to open both valves and means in the connection to said second valve for delaying the reverse operation of said second valve whereby air flows through said first tube after the water is cut off in said second tube whereby air under pressure flowing through said first tube and the introduction of water thereinto by said second tube will provide a water mist spray for the interior of the hollow glass articles being formed.

References Cited by the Examiner
UNITED STATES PATENTS

| | | | |
|---|---|---|---|
| 2,066,283 | 12/1936 | Wadman | 65—115 |
| 2,273,778 | 2/1942 | Berthold | 65—69 |
| 2,282,848 | 5/1942 | Berthold | 65—262 |
| 2,345,808 | 4/1944 | Green | 65—348 X |
| 2,390,910 | 1/1945 | Aksomitas | 65—114 |
| 2,495,253 | 1/1950 | Hayes | 65—82 |

DONALL H. SYLVESTER, *Primary Examiner.*